US00RE48234E

(19) United States
(12) Reissued Patent
Baker et al.

(10) Patent Number: US RE48,234 E
(45) Date of Reissued Patent: Sep. 29, 2020

(54) METHOD FOR COMMUNICATING AND RADIO STATION THEREFOR

(71) Applicant: KONINKLIJKE PHILIPS N.V., Eindhoven (NL)

(72) Inventors: Matthew P. J. Baker, Canterbury (GB); Timothy J. Moulsely, Caterham (GB); Paul Bucknell, Brighton (GB); Bernard Hunt, Redhill (GB); Milos Tesanovic, Isleworth (GB)

(73) Assignee: KONINKLIJKE PHILIPS N.V., Eindhoven (NL)

(21) Appl. No.: 15/654,079

(22) Filed: Jul. 19, 2017

Related U.S. Patent Documents

Reissue of:
(64) Patent No.: 9,088,998
Issued: Jul. 21, 2015
Appl. No.: 12/922,698
PCT Filed: Mar. 16, 2009
PCT No.: PCT/IB2009/051067
§ 371 (c)(1),
(2) Date: Sep. 15, 2010
PCT Pub. No.: WO2009/115971
PCT Pub. Date: Sep. 24, 2009

(30) Foreign Application Priority Data

Mar. 21, 2008 (EP) ..... 08305066

(51) Int. Cl.
*H04W 72/12* (2009.01)
*H04W 72/04* (2009.01)
*H04W 92/18* (2009.01)

(52) U.S. Cl.
CPC ... *H04W 72/1221* (2013.01); *H04W 72/0413* (2013.01); *H04W 72/042* (2013.01); *H04W 92/18* (2013.01)

(58) Field of Classification Search
CPC ..... H04W 72/0413; H04W 72/1221
See application file for complete search history.

(56) References Cited

U.S. PATENT DOCUMENTS 5,239,543 A * 8/1993 Janssens ..... 370/458
5,740,166 A * 4/1998 Ekemark et al. ..... 370/331
6,122,267 A * 9/2000 Abiven et al. ..... 370/338
(Continued)

FOREIGN PATENT DOCUMENTS

EP 2061265 A1 5/2009
KR 20050011291 A * 1/2005
(Continued)

OTHER PUBLICATIONS

3GPPTS36_321: Overview of Specification, I Page Document.

*Primary Examiner* — Eron J Sorrell

(57) ABSTRACT

The present invention relates to a method for communicating between a primary station and a secondary station comprising (a) at the secondary station, upon arrival of a data packet to be transmitted to the primary station, buffering said data packet in a buffer, (b) at the secondary station, after the expiration of a time period starting at arrival of the data packet, transmitting to the primary station a request for an uplink transmission resource if a grant of uplink transmission resource is not received during the said time period, (c) at the primary station, granting to the secondary station an uplink transmission resource.

27 Claims, 1 Drawing Sheet

(56) References Cited

U.S. PATENT DOCUMENTS

| | | | | |
|---|---|---|---|---|
| 6,407,993 | B1 * | 6/2002 | Moulsley | 370/347 |
| 7,068,599 | B1 * | 6/2006 | Jiang et al. | 370/230.1 |
| 7,142,522 | B2 * | 11/2006 | Baudoin et al. | 370/322 |
| 7,443,830 | B2 * | 10/2008 | Engels et al. | 370/347 |
| 7,953,003 | B2 | 5/2011 | Moulsley | |
| 8,031,656 | B2 * | 10/2011 | Balachandran et al. | 370/328 |
| 8,135,429 | B2 * | 3/2012 | Kuroda et al. | 455/522 |
| 2005/0083943 | A1 * | 4/2005 | Lee | H04L 47/10 370/395.4 |
| 2006/0104340 | A1 | 5/2006 | Walton et al. | |
| 2007/0280183 | A1 * | 12/2007 | Cho | H04W 52/04 370/338 |
| 2008/0085719 | A1 * | 4/2008 | Kuchibhotla | H04L 47/14 455/452.1 |
| 2008/0159183 | A1 * | 7/2008 | Lindoff | H04L 1/1664 370/278 |
| 2008/0213818 | A1 * | 9/2008 | Gahery-Segard et al. | 435/29 |
| 2009/0213818 | A1 * | 8/2009 | Park et al. | 370/336 |
| 2009/0225739 | A1 * | 9/2009 | Yeo et al. | 370/345 |

FOREIGN PATENT DOCUMENTS

| | | | |
|---|---|---|---|
| KR | 20070073953 | A | 7/2007 |
| WO | 2006075293 | A1 | 7/2006 |
| WO | 2007108657 | A1 | 9/2007 |
| WO | 2008025233 | A1 | 3/2008 |

* cited by examiner

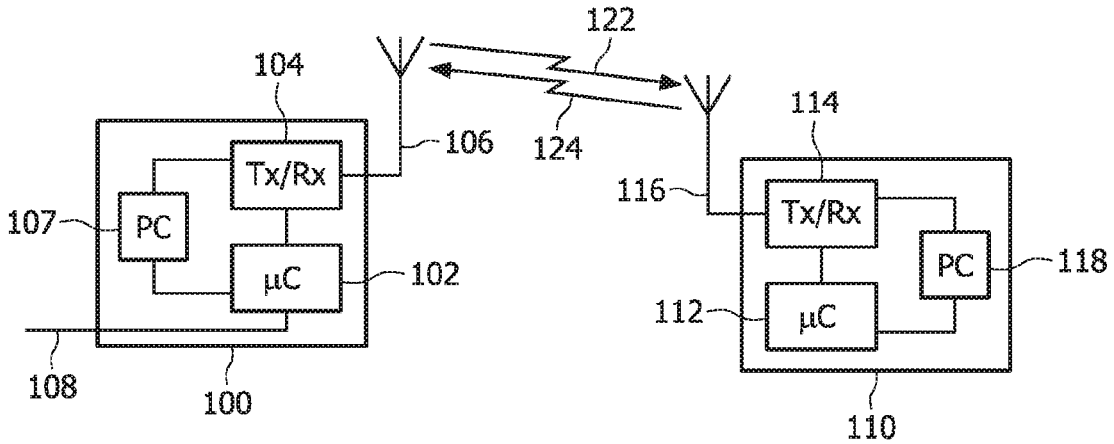
122
104
106
124
114
116
Tx/Rx
107
PC
µC
102
Tx/Rx
PC
118
112
µC
108
100
110
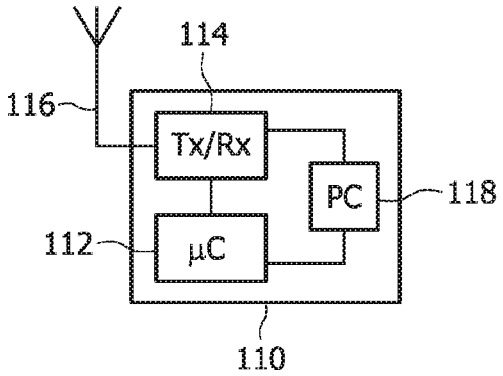
114
116
Tx/Rx
PC
118
112
µC
110

METHOD FOR COMMUNICATING AND RADIO STATION THEREFOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The present invention relates to a method for communicating in a network. More specifically, the present invention relates to communication between a primary station and a secondary station, in a telecommunication network, like a cellular telecommunication network (e.g. UMTS, GSM).

BACKGROUND OF THE INVENTION

In a cellular network, each cell comprises a primary station, like a base station, or a Node B, or an eNB communicating with a plurality of secondary stations, like mobile stations, or User Equipments. To be able to send data to the primary station on some uplink channels, a secondary station must have an allocated resource (time slot, frequency subcarrier, and/or code or likewise).

Many communication systems operate using a centralised scheduler which is responsible for allocating transmission resources to different nodes. A typical example is the uplink of the UMTS LIE (Long Term Evolution), where the uplink transmissions from different secondary stations are scheduled in time and frequency by the primary station. The primary station transmits a "scheduling grant" message to a secondary station, indicating a particular time-frequency resource for the secondary station's transmission, typically around 3 ms after the transmission of the grant message. The grant message also typically specifies transmission parameters as the data rate and/or power to be used for the secondary station transmission.

In order for the primary station to issue appropriate grants, it needs to have sufficient information about the amount and type of data awaiting transmission in the buffer of each secondary station.

In LTE, several types of buffer status report (BSR) messages are therefore defined, which may be transmitted from a secondary station to the primary station when certain triggers occur. The current version of 3GPP TS36.321 is incorporated by reference.

The Buffer Status reporting procedure is used to provide the serving primary station with information about the amount of data in the uplink buffers of the secondary station. Two kinds of Buffer Status Reports are used depending on the events. A short Buffer Status Report (BSR) comprises the identity of a single group of logical channels, together with a G-bit indicator of the amount of data corresponding to that group of logical channels currently residing in the secondary station buffer awaiting transmission. A long BSR comprises four concatenated short BSRs, each corresponding to a different group of logical channels.

A problem with the BSR procedure defined above is that a secondary station is only permitted to transmit a BSR if it has a granted resource in which to transmit. If new data arrives in a secondary station's buffer and the secondary station has no granted resource in which to transmit the data or to send a BSR to indicate that it has data awaiting transmission, the secondary station must either wait until a grant is received, or transmit a simpler version of the BSR which can be transmitted using some specially-designated resources which can be used without a specific granted resource. This simpler version of the BSR is known as a "scheduling request" (SR), and typically comprises only a single bit to indicate that data is in the buffer. It is also known for an SR to comprise a small plurality of bits, which gives greater functionality. In response to receiving an SR, a primary station may either transmit a grant allocating a suitable amount of transmission resource for the secondary station then to send a BSR, or transmit a grant allocating a larger amount of transmission resource which would enable the secondary station to transmit some data in addition to the BSR; however, in the latter case there is typically no means for the primary station to determine a suitable size of allocation to make, unless the SR comprises more than a single bit.

In a known implementation, a secondary station without an uplink transmission grant sends an SR as soon as data arrives in its buffer. However, this is inefficient and wasteful of resources if the primary station would in any case provide a grant within an acceptable delay.

However, if the secondary station were always to refrain from transmitting an SR and to wait for a grant to be received, Quality of Service (QoS) criteria could be breached if the primary station did not provide a grant within an acceptable delay.

SUMMARY OF THE INVENTION

It is an object of the invention to propose a method for communicating in network which alleviates the above mentioned problem.

Another object of the invention is to propose a method which permits to indicate to the primary station to be aware of the state of the buffer of the secondary stations without creating too much overhead.

Still another object of the invention is to propose a method reducing the unnecessary transmission of scheduling requests, while allowing QoS requirements to be satisfied. It is required that uplink data transmission occurring within specified latency contraints.

To this end, in accordance with the invention, it is proposed a method for communicating between a primary station and a secondary station comprising (a) at the secondary station, upon arrival of a data packet to be transmitted to the primary station, buffering said data packet in a buffer, (b) at the secondary station, after the expiration of a time period starting at arrival of the data packet, transmitting to the primary station a request for an uplink transmission resource if a grant of uplink transmission resource is not received during the said time period, (c) at the primary station, granting to the secondary station an uplink transmission resource.

As a consequence, this prevents the secondary station from transmitting unnecessary scheduling requests. Indeed, only if an uplink transmission resource is not received during said time period, the secondary station sends a scheduling report. Moreover, the time period may be adjusted in accordance to events or conditions of transmission.

The present invention also relates to a secondary station comprising means for transmitting data to a primary station on an uplink channel, buffering means for buffering data packets to be transmitted to the primary station upon arrival of said data packets, means for requesting, after the expiration of a time period starting at arrival of the data packet, the primary station to grant an uplink transmission resource if a grant of uplink transmission resource is not received during the said time period.

According to another aspect of the invention, it is proposed a system comprising at least one secondary station in accordance with the invention and a primary station, said primary station comprising means for granting to the secondary station an uplink transmission resource.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawing, wherein:

FIG. 1 is a block diagram of a system in accordance with the invention comprising a primary station and at least a secondary station.

DETAILED DESCRIPTION OF THE INVENTION

The present invention relates to a method for communicating in a network, like a cellular network. For instance, the network may be a UMTS network as depicted on FIG. 1.

Referring to FIG. 1, a radio communication system in accordance with the invention comprises a primary station (BS) 100 and a plurality of secondary stations (MS) 110. The primary station 100 comprises a microcontroller (μC) 102, transceiver means (Tx/Rx) 104 connected to antenna means 106, power control means (PC) 107 for altering the transmitted power level, and connection means 108 for connection to the PSTN or other suitable network. Each MS 110 comprises a microcontroller (μC) 112, transceiver means (Tx/Rx) 114 connected to antenna means 116, and power control means (PC) 118 for altering the transmitted power level. Communication from primary station 100 to mobile station 110 takes place on a downlink channel, while communication from secondary station 110 to primary station 100 takes place on an uplink channel.

According to a first embodiment of this invention, it is provided a means to control the circumstances in which a secondary station sends a Scheduling Request (SR) or a request of resource, in order to avoid unnecessary transmission of SRs, while also allowing QoS requirements to be satisfied (i.e. uplink data transmission occurring within specified latency constraints).

According to this first embodiment of the invention, a secondary station which does not have an uplink grant when data arrives in its buffer waits for a given delay period before it transmits an SR. If a grant is received during this period, the secondary station refrains from transmitting an SR, and uses the transmission resources provided by the received grant.

In examples of this embodiment, the delay or time period before transmitting an SR may be determined according different methods. In a first variant, this delay is of a predetermined duration. This duration may be transmitted to the secondary station by means of a signaling channel. For instance, the primary station sends on a control channel the time duration.

In another variant, this duration may correspond to one or more data characteristic, i.e characteristics of data which had arrived in the buffer. This permits to have an appropriate time delay to each situation. These data characteristics may be for instance:

- an indication of the priority of the data;
- QoS parameters of the data (e.g. latency requirements, or a function thereof)
- an identity of a logical channel or group of logical channels to which the data is assigned, an identity of a kind of data;
- the amount of data which had arrived in the buffer;
- the total amount of data in the buffer;
- the rate of arrival of data in the buffer;
- the time since the previous arrival of data in the buffer.

Thus, if the data is of high priority, or if the amount of data in the buffer or the amount of data which had arrived is great, then the time duration is shorter.

In another example, the time delay is based on any change of cell. If a cell change has occurred within a preceding time period, the time period duration may be shortened.

In still another example, the time period duration is based on the time elapsed since the secondary station last requested a resource by sending an SR or sending a BSR without receiving a corresponding grant. If no resource has been allocated to the secondary station for a long time, it may be urgent to provide resource to this secondary station, so the time period is shortened.

In another example of this embodiment, the time period duration takes into account one or more characteristics of the radio channel. Indeed, if the radio channel conditions are not good, it may be interesting for the secondary station to wait before asking for resource. Examples of radio channel characteristics that can be used to simply estimate the conditions of the radio channel are given below:

- the rate at which the secondary station could transmit data under the current channel conditions;
- the current uplink transmission power requested by the primary station—e.g. a high power could be an indicator of poor channel quality;
- an estimate of the downlink channel quality as an indicator of uplink channel quality (especially in a TDD system).

In one embodiment of this invention, a secondary station receives grants to transmit data from time to time. When a new data packet arrives in the secondary station's buffer, the secondary station checks the priority of the data packet, and waits for a time period corresponding to the priority of the data packet before sending an SR. For example, if the priority of the data is high, the secondary station would wait for a shorter time period than if the priority of the data is low. In any case, if a grant is received during the time period, the secondary station refrains from sending an SR.

In another embodiment of this invention, a secondary station receives grants to transmit data from time to time. When a new data packet arrives in the secondary station's buffer, the secondary station checks the amount of data in the data packet, and waits for a time period corresponding to the amount of data before sending an SR. For example, if the amount of data is high, the secondary station would wait for a shorter time period than if the amount of data is low. In any case, if a grant is received during the time period, the secondary station refrains from sending an SR.

In accordance with a further embodiment of the invention, a secondary station which does not have an uplink grant may also transmit an SR in response to data arriving in its buffer, if the secondary station can determine that the primary station is not likely to provide a grant within an acceptable time delay (and otherwise the secondary station refrains from sending an SR or waits for some time duration to elapse before sending an SR). Once this SR is sent, the secondary station waits for a time period before sending another SR if no uplink resource has been granted, like in the previous embodiments.

The secondary station sends an SR at the earliest opportunity if the time since the last grant is greater than a threshold in a first example of this embodiment.

In another example of this embodiment, the condition which must be satisfied is that average time between previous grants in a given time window is greater than a threshold. This permits to have more equity between all the secondary stations.

In another example, the size of resource (measured in e.g. bits) allocated in the previous grant is less than a threshold, or the average size of resource allocated in a predetermined number of previous grants or in all the previous grants received in a given time window is less than a threshold. Similarly, the total amount of resource allocated in a predetermined number of previous grants or in all the previous grants received in a given time window is less than a threshold.

In the above examples, the thresholds may be predetermined. This threshold may be for example transmitted to the secondary station by means of a signaling channel. For instance, the primary station sends on a control channel the time duration of the threshold.

But to obtain a system which is more appropriate to each situation, the threshold may be dependent on characteristics. In an example of this embodiment, the threshold depends on one or more data characteristic of the data which had arrived in the buffer. Some examples of suitable data characteristics include:

- an indication of the priority of the data;
- QoS parameters of the data (e.g. latency requirements, or a function thereof)
- an identity of a logical channel or group of logical channels to which the data is assigned;
- the amount of data which had arrived in the buffer;
- the amount of data in the buffer;
- the rate of arrival of data in the buffer;
- the time since the previous arrival of data in the buffer.

Thus, if the data is of high priority, or if the amount of data in the buffer or the amount of data which had arrived is great, then the threshold is lower.

In another example, the threshold depends on whether or not a cell change has occurred within a preceding time period. If a cell change has occurred within a preceding time period, the threshold may be lowered.

In still another example, the threshold is based on the time elapsed since the secondary station last requested a resource by sending an SR or sending a BSR without receiving a corresponding grant. If no resource has been allocated to the secondary station for a long time, it may be urgent to provide resource to this secondary station, so the threshold is lowered to enable the secondary station to request such resource.

In another example of this embodiment, the threshold determination method takes into account one or more characteristics of the radio channel. Indeed, if the radio channel conditions are not good, it may be interesting for the secondary station to wait before asking for resource. Examples of radio channel characteristics that can be used to simply estimate the conditions of the radio channel are given below:

- the rate at which the secondary station could transmit data under the current channel conditions,
- the current uplink transmission power requested by the primary station—e.g. a high power could be an indicator of poor channel quality;
- An estimate of the downlink channel channel quality as an indicator of uplink channel quality (especially in a TDD system).

A combination of any of the above—e.g. a threshold set on the basis of priority of data, but modified according to uplink channel quality—for example, if the channel quality is good but the UE has not received a grant for a long period, it could be inferred that the absence of a grant is not due to poor channel quality and therefore the threshold for sending an SR could be set lower.

Note that in some embodiments the criteria used to determine whether an SR is transmitted may depend on at least one characteristic of the data, examples of which are:

- an indication of the priority of the data;
- QoS parameters of the data (e.g. latency requirements, or a function thereof)
- an identity of a logical channel or group of logical channels to which the data is assigned.;
- the amount of data which had arrived in the buffer;
- the amount of data in the buffer;
- the rate of arrival of data in the buffer;
- the time since the previous arrival of data in the buffer.

Note also that an embodiment in which the secondary station sends an SR if the total amount of resource allocated in all the previous grants received in a given time window is less than a threshold, where the threshold is derived from the amount of data which had arrived in the buffer, amounts to a situation where the secondary station determines that the data which has arrived in the buffer exceeds that which the primary station has historically expected—in other words, the data which has arrived in the buffer is probably outside the knowledge of the primary station.

A particular example of this embodiment could comprise a configuration in which the primary station configured persistently-scheduled uplink transmission resources corresponding to a regular arrival rate of packets in the secondary station's buffer—for example for VoIP application. If a packet arrived in the secondary station's buffer at a different time from one of the usual VoIP time instants corresponding to the persistent schedule, the secondary station would send an SR, whereas a packet arriving in accordance with the persistent schedule of granted resources would not trigger an SR.

In another similar embodiment, if a packet arrived in the secondary station's buffer with a larger size than usual the secondary station would send an SR to request additional resources. Whereas a packet arriving with a size in accordance with the persistent schedule of granted resources would not trigger an SR.

In one embodiment of this invention, a primary station receives grants to transmit data from time to time. When a new data packet arrives in the secondary station's buffer, the secondary station checks the priority of the data packet, and if the priority is higher than a first threshold and the elapsed time since the last received grant is longer than a second threshold, the secondary station sends an SR; otherwise the secondary station refrains from sending an SR. The second threshold may be a function of the priority—for example, the allowed time delay could be longer for low-priority data.

In another embodiment of this invention, a secondary station receives grants to transmit data from time to time. When a new data packet arrives in the secondary station's buffer, the secondary station checks the amount of data in the data packet, and if the amount of data is higher than a first threshold and the elapsed time since the last received grant is longer than a second threshold, the secondary station sends an SR; otherwise the secondary station refrains from sending an SR. The second threshold may be a function of the amount of data—for example, the allowed time delay could be longer for small amounts of data.

This invention may be used in communication systems utilizing centralized scheduling, such as UMTS and LTE, Mobile terminals for use in such systems or Hubs which route calls from multiple terminals to base stations. Such devices would appear like a UE from the point of view of the network.

It is to be noted that the present invention is not limited to the examples described above and can be adapted. For instance, it is to be understood that in some adaptations, the role of the primary station may be a mobile station and the secondary station may be a base station. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single unit may fulfill the functions of several items recited in the claims. The mere fact that certain measures are recited in mutually different dependent claims does not indicate that a combination of these measured cannot be used to advantage.

The invention claimed is:

1. A method for communicating between a primary station and a secondary station comprising:

(a) at the secondary station, upon arrival of a data packet to be transmitted to the primary station, buffering said data packet in a buffer, (b) at the secondary station, after the expiration of a time period, said time period starting at arrival of the data packet and having a duration based on at least one characteristic of data in the data packet, wherein said time period is adjusted *by the secondary station* in consideration of data transmission requirements, transmitting to the primary station a request for an uplink transmission resource [if] *in response to the secondary station determining that* a grant of uplink transmission resource is not received *by the secondary station* during said time period, (c) at the secondary station, receiving an uplink transmission resource from the primary station in response to said request.

2. The method of claim 1, wherein said data transmission requirements represent a Quality of Service.

3. The method of claim 1, wherein the at least one characteristic of data comprises one or more of an indication of data priority, a Quality of Service parameters, an identity of a logical channel or group of logical channels to which the data packets are assigned, an amount of data in the buffer, an amount of data which arrived, a rate of arrival of data, or a time elapsed since a previous arrival of data.

4. The method of claim 1, wherein the secondary station operates in a radio cell, and wherein the time period is based on a time elapsed since the secondary station has started to operate in said radio cell.

5. The method of claim 1, wherein the time period is based at least on a time elapsed since the secondary station last transmitted a request for an uplink transmission resource.

6. The method of claim 1 wherein the time period is based at least on a time elapsed since the secondary station last transmitted a request for an uplink transmission resource corresponding to a specific amount of data and did not receive a corresponding grant of resource.

7. The method of claim 1, wherein the time period is based at least on a set of uplink channel characteristics.

8. The method of claim [6] *7*, wherein the set of uplink channel characteristic comprises one or more of an uplink channel quality, a transmission rate corresponding to the uplink channel quality, or an uplink transmission power.

9. The method of claim [6] *7*, wherein the set of uplink channel characteristics is estimated based on characteristics related to a downlink channel.

10. The method of claim 1, wherein the time period is predetermined.

11. A secondary station comprising

[means for transmitting] *a transceiver configured to transmit* data to a primary station on an uplink channel,

*a microprocessor configured to:*

[means for buffering] *buffer* data packets to be transmitted to the primary station upon arrival of said data packets,

[means for requesting] *request*, after the expiration of a time period, the primary station to grant an uplink transmission resource [if] *in response to the secondary station determining that* a grant of uplink transmission resource is not received *by the secondary station* during said time period, said time period starting at arrival of the data packet and having a duration based at least on a characteristic of data in the data packet, wherein said time period is adjusted *by the secondary station* in consideration of data transmission requirements.

12. The secondary station of claim 11, wherein said data transmission requirements represent a Quality of Service.

13. A secondary station comprising:

a transceiver; and a microprocessor configured to:

buffer a data packet [received from said] *that is to be transmitted utilizing the* transceiver;

transmit a request, through said transceiver and after the expiration of a time period, for a grant of uplink transmission resource [if] *in response to the secondary station determining that* a grant of uplink transmission resource is not received *by the secondary station* during the time period, said time period starting at arrival of the data packet and having a duration based at least on a characteristic of data in the data packet, wherein said time period is adjusted *by the microprocessor* in consideration of data transmission requirements.

14. The secondary station of claim 13, wherein the characteristic of data comprises one or more of an indication of data priority, a Quality of Service parameters, an identity of a logical channel or group of logical channels to which the data packets are assigned, an amount of data in the buffer, an amount of data which arrived, a rate of arrival of data, or a time elapsed since a previous arrival of data.

15. The secondary station of claim 13, wherein the secondary station operates in a radio cell, and wherein the time period is based on a time elapsed since the secondary station has started to operate in said radio cell.

16. The secondary station of claim 13, wherein the time period is based at least on a time elapsed since the secondary station last transmitted a request for an uplink transmission resource.

17. The secondary station of claim 13, wherein the time period is based at least on a time elapsed since the secondary station last transmitted a request for an uplink transmission resource corresponding to a specific amount of data and did not receive a corresponding grant of resource.

18. The secondary station of claim 13, wherein the time period is based at least on a set of uplink channel characteristics.

19. The secondary station of claim 18, wherein the set of uplink channel characteristic comprises one or more of an uplink channel quality, a transmission rate corresponding to the uplink channel quality, or an uplink transmission power.

20. The secondary station of claim 18, wherein the set of uplink channel characteristics is estimated based on characteristics related to a downlink channel.

21. The secondary station of claim 13, wherein the time period is received by the secondary station.

22. The secondary station of claim 21, wherein the characteristic of data comprises one or more of an indication of data priority, a Quality of Service parameters, an identity of a logical channel or group of logical channels to which the data packets are assigned, an amount of data in the buffer, an amount of data which arrived, a rate of arrival of data, or a time elapsed since a previous arrival of data.

23. The secondary station of claim 13, wherein said data transmission requirements represent a Quality of Service.

24. A system comprising:

at least one secondary station comprising:

[means for transmitting] *a transceiver configured to transmit* data to a primary station on an uplink channel,

*a microprocessor configured to:*

[means for buffering] *buffer* data packets to be transmitted to the primary station upon arrival of said data packets,

[means for requesting] *request*, after the expiration of a time period, the primary station to grant an uplink transmission resource [if] *in response to the secondary station determining that that* a grant of uplink transmission resource is not received *by the secondary station* during said time period, said time period starting at arrival of the data packet and having a duration based at least on a characteristic of data in the data packet, wherein said time period is adjusted *by the microprocessor* in consideration of data transmission requirements and a primary station comprising:

[means for granting] *a microprocessor configured to grant* to the secondary station an uplink transmission resource.

25. The system of claim 24, wherein said data transmission requirements represent a Quality of Service.

26. A secondary station comprising:

a transceiver; and a microprocessor in communication with said transceiver, said microprocessor configured to:

receive a data packet [from said] *that is to be transmitted utilizing the* transceiver, initiate a timer upon receipt of said data packet;

determine a time period in consideration of data transmission requirements, said time period being based at least on a characteristic of data in the data packet, wherein said timer is configured to elapse after said time period;

determine whether a grant of uplink transmission resources has been received during said time period; and transmit, through said transceiver, a request for an uplink transmission resource [if] *in response to the secondary station determining that* a grant of uplink transmission resource is not received *by the secondary station* during said time period.

27. The secondary station of claim 26, wherein said data transmission requirements represent a Quality of Service.

* * * * *